Jan. 13, 1970     H. KRAUS     3,489,483
READING DEVICE FOR MEASURING RODS
Filed Oct. 14, 1966     2 Sheets-Sheet 1
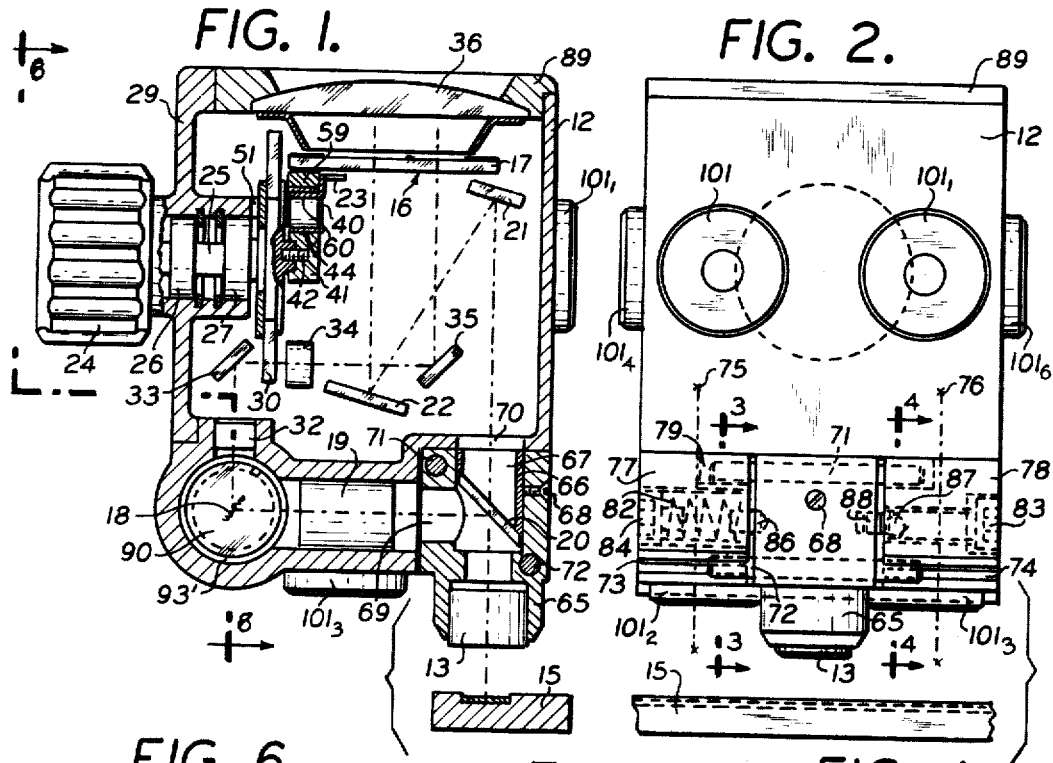
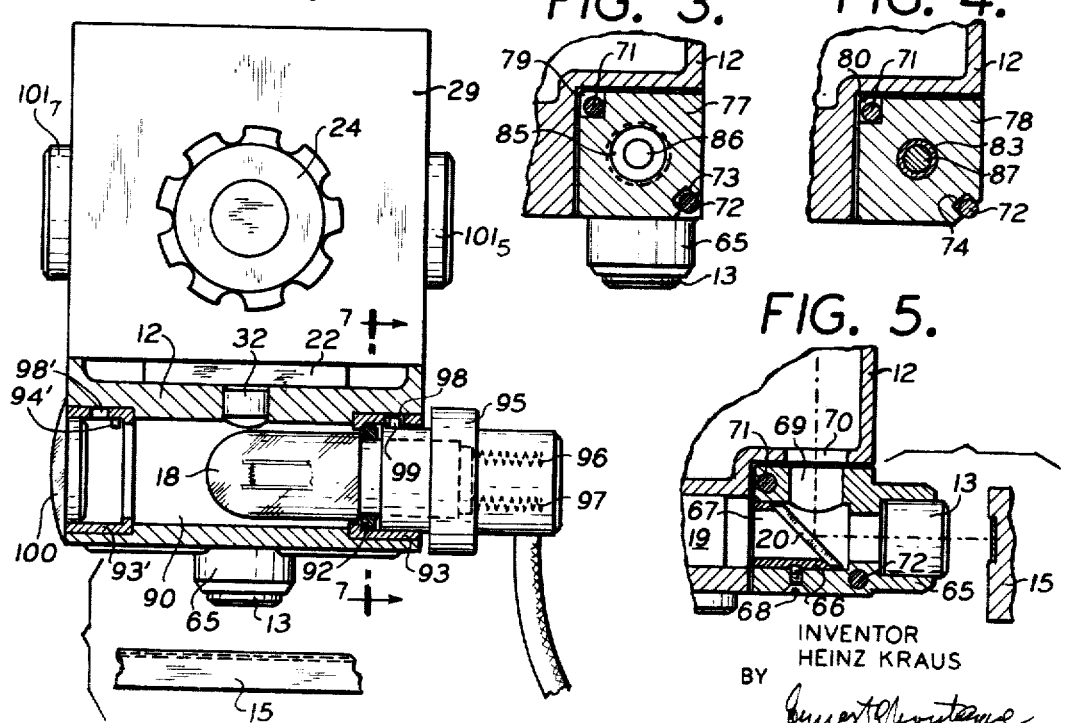
INVENTOR
HEINZ KRAUS
BY
ATTORNEY.

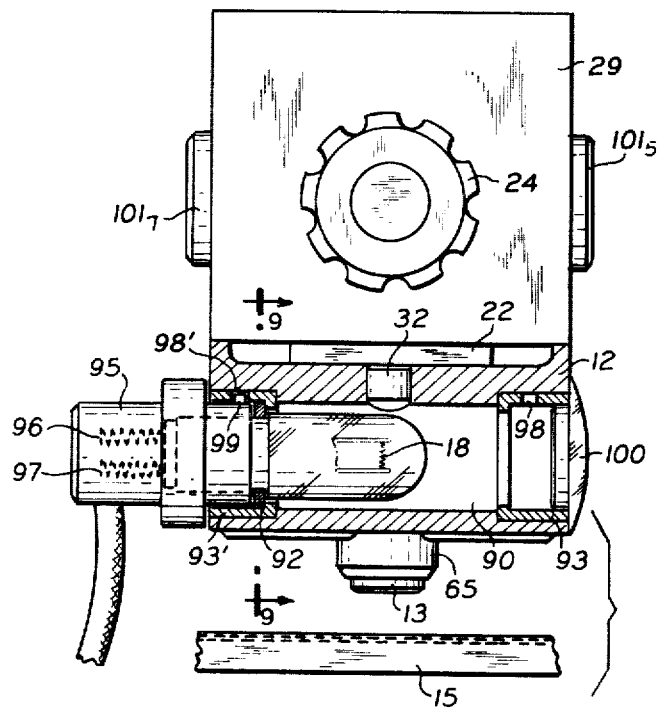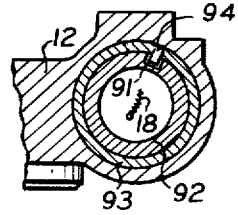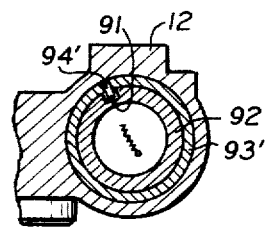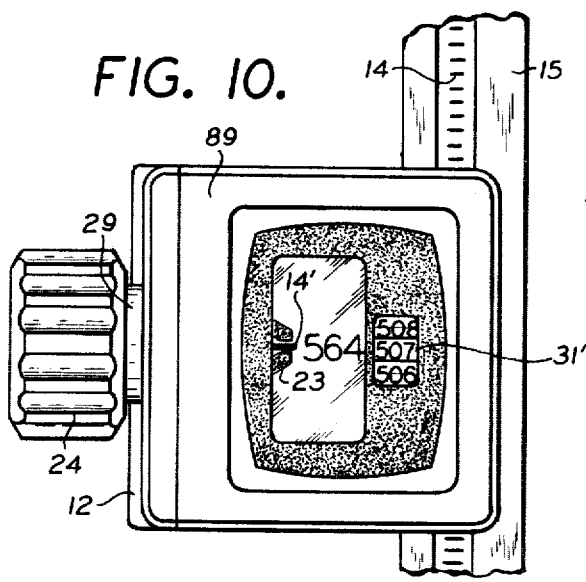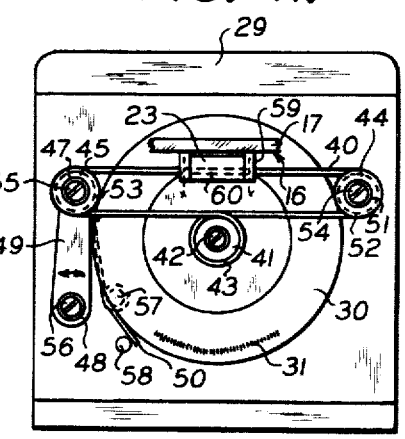

United States Patent Office 3,489,483
Patented Jan. 13, 1970

1

3,489,483
READING DEVICE FOR MEASURING RODS
Heinz Kraus, Traunreut, Upper Bavaria, Germany, assignor, by mesne assignments to, Johannes Heidenhain, Traunreut, near Traunstein, Germany, a corporation of Germany
Filed Oct. 14, 1966, Ser. No. 586,833
Int. Cl. G02b 17/06, 27/02, 27/24
U.S. Cl. 350—113                                            8 Claims

ABSTRACT OF THE DISCLOSURE

A reading device for a measuring rod having graduations, which comprises a housing and an image receiving means defining an image plane disposed in the housing. Two deflecting optical systems are disposed in the housing and include at least one light system. One of the deflecting optical systems projects a first scale onto the image plane and the other of the deflecting optical systems projects a second scale onto the image plane. Means are provided for setting and indicating the image of the first scale and the second scale is moved simultaneously with the setting of the image of the first scale, so that the image of the second scale is projected by optical alignment of the other optical system onto the image plane adjacent the image of the first scale. The second scale moves with the setting of the first scale for at least a part of an interval fraction of the formation of the first scale.

---

The present invention relates to a reading device for measuring rods, in general, and to such reading device in which the graduations of the measuring rod are imaged by means of an objective in a reading window of the device, in particular, and in which furthermore a lamp is provided and light rays originating from the lamp are diverted by means of a partly permeable diverting element over the objective to the measuring rod, and in which means are provided for indicating the interval fractions of the measuring rod.

In the known reading devices of this type, the objective imaging the graduations of the measuring device in the reading window of the device is arranged immovably at a predetermined point in the housing of the device. Since such reading devices are, however, incorporated in tool- or measuring machines under different structure conditions, it occurs often, that the reading window of the device assumes a position directed opposite to the viewing direction of the observer, due to the relative position of the measuring rod and the reading device, determined by the objective, which position renders more difficult the reading of the device, or renders it, in some cases, even questionable.

For this reason, different structures of the same type of devices have been proposed before, which different types distinguish over each other by the different position of the objective relative to the viewing direction of the device. Thus, for instance, in one of the possible structure types, the axis of the objective is disposed in the viewing direction of the device and in another structure, however, the axis of the objective is disposed perpendicular to the veiwing direction of the device.

It is of disadvantage that, for the particular application of the device, the particular structure type must be chosen and, thus, the usability of the device is set for this particular application. The user of the device loses thus the possibility to apply the device for other purposes.

2

For removal of the above-stated disadvantage, it is known already to equip reading devices with a mirror to be mounted, if required, which mirror causes a deviation of the viewing direction by 90° and thus renders possible a universal application of the device. The mirror is thereby coordinated to the reading window of the device and is arranged in an upwardly liftable cover of the device.

It is a disadvantage in these devices that the mirror requires an appreciable enlargement of the structure of the device, which renders difficult quite often the application of the device to a machine or even renders it questionable.

In addition to the additional costs caused by the supplementary device, the optical drawback of the mirror used for the reading also carries some weight.

It is one object of the present invention to provide a reading device for measuring rods, which removes the drawbacks inherent in the known reading devices.

It is another object of the present invention to provide a reading device for measuring rods, wherein a universal application, as well as space-saving structure is provided.

It is still another object of the present invention to provide a reading device for measuring rods, wherein securing means are provided on the reading device which permit the arrangement of the objective in the portion of the light rays originating from the lamp deviated in the partly permeable mirror, as well as in the portion of the light rays straightly passing the mirror.

It is still another object of the present invention to provide a reading device for measuring rods, wherein the objective and the partly permeable deviating element comprises a closed structural group selectively provided in different directions, which structural group, furthermore, is mounted displaceably on the reading device for the setting of the full value position in dividing direction of the measuring rod.

The simple structure of the device created by the present invention is still further enhanced by a particularly simple displacing drive for the means for indication of the interval fractions of the measuring rod. The means for the indication of the interval fractions are in this case a fork member and a circularly-shaped fine scale connected therewith.

The displacing drive comprises, in a further embodiment of the present invention, an arrangement according to which the connection between the fork member and the fine scale consists of a band which is wound around a shaft carrying the fine scale and which carries directly the displaceable fork member.

Furthermore, in a further embodiment of the present invention, the lamp is insertable selectively from two sides into the lamp housing, corresponding to the securing position of the reading device. By this arrangement, it is made possible to form a plurality of or all faces not used for the reading window and under circumstances for the setting knob for the interval fraction, of the about cube-shaped housing as possible securing faces.

With these and other objects in view, which will become apparent in the following detailed description, the present invention will be clearly understood in connection with the accompanying drawings, in which:

FIG. 1 is a vertical section of the reading device, its objective being disposed in that part of the light rays deviated by the mirror;

FIG. 2 is a side elevation of the device disclosed in FIG. 1;

FIG. 3 is a section along the lines 3—3 of FIG. 2;

FIG. 4 is a section along the lines 4—4 of FIG. 2;

FIG. 5 is a fragmentary section of the device disclosed in FIG. 1, in which the objective is disposed in the portion of the light rays which pass through the mirror;

FIG. 6 is a section along the lines 6—6 of FIG. 1, in which the lamp is set from the right side of a setting knob into the lamp housing;

FIG. 7 is a section along the lines 7—7 of FIG. 6;

FIG. 8 is a section along the lines 8—8 of FIG. 1, however, contrary to the showing in FIG. 6, the lamp is inserted left of the setting knob into the lamp housing;

FIG. 9 is a section along the lines 9—9 of FIG. 8;

FIG. 10 is a top plan view of the reading device disclosed in FIG. 1; and

FIG. 11 is a fragmentary elevation of the displacing drive disclosed in FIG. 1.

Referring now to the drawings, the reading device, designed in accordance with the present invention, comprises a housing 12 on the bottom side of which is disposed an objective 13, which projects a numbered division 14 of the measuring rod 15 into the image plane 16. The latter comprises a frosted bottom side of a glass plate 17. The division 14 of the measuring rod 15 is lit from above by means of a lamp 18 disposed in the housing 12, over a condenser 19, a semi-permeable mirror 20 and the objective 13. Deviation mirrors 21 and 22 are also provided in the housing 12.

By means of a turning knob 24, a catching fork member 23, sliding closely below the image plane 16, is displaced, until the graduation image 14' is disposed symmetrically between the leg portion of the fork member 23. A certain predetermined position of the catching fork member 23 in the image plane 16 is coordinated to a predetermined rotary position of the rotary knob 24 secured to an axle 25. The axle 25 is rotatably mounted in the housing portion 29 by means of two ball bearings 26 and 27 and is axially fixed play-free in a manner not shown.

A transparent disk 30 is rigidly connected with the axle 25, which transparent disk 30 carries a plurality of numbers 31 (FIG. 11) concentrically to the axle 25. During the rotation of the axle 25, these numbers 31 pass a second projection optical device consisting of a condenser 32, a mirror 33, an objective 34 and a mirror 35, so that always a number of the series of numbers disposed on the transparent disk 30 is imaged in the image plane 16 of the first projection ray path.

As indicated in FIG. 10, the image 31' of one of the numbers 31 adjacent the image 14' of the numbered division 14 of the measuring rod 15 is visible, so that the exact position of the graduation image 14' caught by the fork member 23 is readable immediately in numbers. The frosted disk 17 is viewed thereby by means of a reading glass 36 disposed in the cover 89.

The connection between the catching fork member 23 and the disk 30 comprises a band 40, which is wound around a disk 41, which disk 41 is secured by means of a screw 42 on the front face of the axle 25. The ends of the band 40, reduced within the range of the displacement path of the fork member 23, are secured in a groove 43 of the disk 41. The band 40 is wound about the ball bearings 44 and 45, which, in turn, are provided on the housing part 29. The ball bearing 45 is connected with a tensioning device by means of an axle 47. The tensioning device comprises a lever 49 rotatably mounted on an axle 48 and a spring 50 engaging the lever 49. It is aimed by the tensioning device to maintain the band 40 continuously under equal pulling tension. The axle 51 fixedly secured in the housing part 29 is the carrier for the ball bearing 44. Thin disks 52 and 53 are provided for the lateral guidance of the band 40, which disks 52 and 53 are retained on both sides of the ball bearings 44 and 45 on the axles 51 and 47. Securing screws 54, 55 and 56 (FIG. 11) retain the respective axles in position. A holding pin 57 secured to the housing part 29 is arranged for holding a spring 50 and in addition an abutment pin 58 is likewise arranged on the housing part 29 and adapted to maintain the spring 50 in tensioned position.

A U-shaped part 59 serves as a carrier for the catching fork member 23, which part 59 is clamped by means of screws (not shown) to the band 40 with the help of a counter-piece 60.

The diameter of the disk 41 is measured such, that the fork member 23 is displaced within the range of an interval of the optically enlarged division of the measuring rod 15 during a full revolution of the fine scale 30. For a limitation of the rotary movement of the rotary knob 24 to a full revolution serves an abutment pin (not shown) received in the rotary knob 24, which abutment pin engages in a manner not shown against a projection on the housing part 29.

The band 40 is in the present instance a thin steel band of a high constancy as to its length.

Means are provided, in accordance with the present invention, on the bottom side of the housing part 12, which permit the provision of the objective 13 within the light rays originating from the lamp 18, the light rays being deviated in the partly permeable mirror 20, as well as in the part of the light rays which pass straightly the mirror 20.

Referring now to FIG. 1 of the drawings, the objective 13 is provided in the part of the light rays emerging from the lamp 18 deviated by the mirror 20. In FIG. 5, however, the objective 13 is disposed in the part of the light rays straightly passing the mirror 20, which light rays emerge from the lamp 18.

In an advantageous manner, the objective 13 and the partly permeable mirror 20 form a structural group closed in itself and attachable selectively in different directions on the housing part 12.

The objective 13 and the mirror 20 are secured in a holder member 65. The mirror 20 is carried thereby by an oblique sleeve 66 which is provided in a bore 67 of the holder 65 and is fixed by means of a screw 68. Bores 69 and 70 are provided in the holder 65, as well as in the housing part 12.

Furthermore, two pins 71 and 72, diagonally set off towards each other, are pressed in the holder 65, which pins 71 and 72 project on both sides of the holder 65. The pins 71 and 72 serve the purpose of centering the holder 65 relative to the housing part 12. As is apparent in FIG. 2, the pin 72 enters grooves 73 and 74 of a carrying body 77 and 78, respectively, screwed at the points 75 and 76 (shown schematically) to the housing part 12 and the pin 71 enters into a recess 79 and 80, respectively, of the mentioned carrying body 77 and 78, respectively.

The objective 13 is displacable for its full value setting in the division direction of the measuring rod 15. The full value setting permits the measuring start always to full intervals of a division 14 of the measuring rod 15. In this case the measuring rod 15 is releasably fixed, yet it is also possible to retain the objective 13 in its position and make the measuring rod or the glass plate 17 displaceable, since a relative displacement of the respective members brings about the same results within the concept of the present invention.

For this purpose, the holder 65 carrying the objective 13 is adjustable against the pressure of a spring 82 by means of a screw 83 within the range of an interval of the division 14.

The spring 82 supports itself thereby against a screw 84 disposed in a bore 85 of the holder 65 and is maintained additionally in center position by means of a cylindrical projection of the screw 84 and a pin 86 disposed in the holder 65. The screw 83 presses by means of a ball 87 against a pin 88 disposed in the holder 65.

A bore 90 constituting the lamp housing is provided in the housing part 12. In accordance with the present invention, the lamp 18 is insertable selectively from two sides into the lamp housing 90 corresponding to the securing position of the reading device. Furthermore, centering means for the lamp 18, preset outside of the device, are arranged in the lamp housing 90.

The lamp 18 carries a ring 92 having a groove 91, which ring 92 is secured to the cylindrical part of the lamp socket in a lamp setting device (not shown).

Sleeves 93 and 93' are arranged in the lamp housing 90, which sleeves 93 and 93' are carriers of centering pins 94 and 94', respectively. The lamp 18 is pressed via the ring 92 by means of springs 96 and 97 provided in a socket 95 against a collar of the sleeves 93 and 93', respectively. Angular grooves 98 and 98', respectively, are arranged in the sleeves 93 and 93', respectively, into which a pin 99 provided on the socket 95 engages in the manner of a bayonet joint. A closing cap 100 closes the lamp housing 90.

In the shown embodiment, all faces of the housing 12 which are not used for the reading window and for the setting knob 24, are formed as securing faces, whereby on each securing face of the housing part 12, two distance disks 101 and 101$_1$; 101$_2$ and 101$_3$; 101$_4$ and 101$_5$; and 101$_6$ and 101$_7$, respectively, are secured by means of screws not projecting beyond the securing face of the distance disks (not shown). The distance discs serve the purpose of applying the reading device to appropriate faces of the tool machine.

The present invention is, of course, not limited to the shown embodiment of the securing faces of the device, rather it is also possible to provide distance disks only for one face of the housing and to arrange the disks on the face required for the securing of the device. The threaded bores on the remaining possible securing faces of the housing are then closed by means of threaded pins.

It is also possible to provide the device without intermediate arrangement of distance disks directly on the faces of the housing to a machine, as long as these faces are formed as plane faces.

Furthermore, the possibility exists to arrange the setting grip for the interval fraction determination on the side of the device at which the reading field is disposed. In this case, it is possible to provide a total of five faces of the device as possible securing faces.

While I have disclosed several embodiments of the present invention, it is to be understood that these embodiments are given by example only and not in a limiting sense.

I claim:

1. A reading device for a measuring rod having graduations comprising
   a housing,
   an image receiving means defining an image plane and disposed in said housing,
   a first deflecting optical system and a second deflecting optical system,
   both said deflecting optical systems being disposed in said housing and including at least one light system,
   said first deflecting optical system projecting a first scale onto said image plane,
   said second deflecting optical system projecting a second scale onto said image plane,
   both said scales carrying information,
   said deflecting optical systems being optically aligned with said corresponding scales,
   means for adjusting one of said deflecting optical systems relative to said first scale for a given distance along said first scale, in order to set said one of said deflecting optical systems relative to said first scale,
   a member indicating an image of said first scale on said image plane,
   means for moving said member along said image plane into a set position corresponding with said first scale,
   said moving means including said second scale for joint movement of the latter during adjustment of said first scale for at least a part of an internal fraction of the information of said first scale, in order to project the information of said first scale and the information of said second scale aligned onto said image plane, so that the image of the information of said second scale appears successively on said image plane during relative movement for at least a part of an internal fraction of said first scale between the latter and said one of said deflecting optical systems, and
   a reading window optionally aligned with said image receiving means for reading the images of the information of said first scale and of said second scale appearing in said image plane.

2. The reading device, as set forth in claim 1 wherein said one of said deflecting optical systems includes an objective and a partly permeable deviation element, and
   said objective and said partly permeable deviation element constitute a structural group closed in itself and attachable in optical alignment to said housing selectively in different directions.

3. The reading device, as set forth in claim 2, which includes
   means for mounting said objective in said housing displaceably in the direction of said information of said first scale.

4. The reading device, as set forth in claim 3, which includes
   a holder member secured to said housing and retaining said objective and said partly permeable deviation element,
   carrying bodies disposed on opposite sides of said holder member and secured to said body,
   a screw bolt is received in one of said carrying bodies and engages one side of said holder member,
   a spring disposed in the other of said carrying bodies and urging said holder member towards said screw bolt, and
   said carrying bodies are disposed along a line substantially parallel to said information of said first scale, so that said holder member is adjustable in the direction of said information against the pressure of said spring.

5. The reading device, as set forth in claim 1, wherein said housing is of cube-configuration, and
   at least a plurality of the outer faces of said housing, except the faces used for said reading window and for said means for indicating interval fractions, respectively, constitute faces for securing said device to a machine.

6. The reading device, as set forth in claim 1, wherein said housing has a bore extending crosswise through said housing and constituting a lamp housing,
   a lamp received in and secured to said lamp housing selectively from either side of said bore depending upon the securing position of said device, and
   said lamp is received in such bore such that the filament of said lamp assumes the same position regardless from which side said lamp has been inserted in said bore of said housing.

7. The reading device, as set forth in claim 6, which includes
   centering means disposed at opposite ends of said lamp housing for said lamp, and the latter being preset outside of said device.

8. The reading device, as set forth in claim 1, wherein said member for indicating an image of the information of said first scale comprises a displaceable fork member and said second scale operatively connected with said fork member,
   a band constituting connecting means between said fork member and said second scale,
   a shaft supporting said second scale, and said band is wound about said shaft and carries said displaceable fork member.

References Cited

UNITED STATES PATENTS

| | | | |
|---|---|---|---|
| 2,941,446 | 6/1960 | Senglet | 350—113 X |
| 3,070,888 | 1/1963 | Gottesmann | 350—113 X |
| 3,106,127 | 10/1963 | Koller | 350—113 X |

FOREIGN PATENTS

| | | |
|---|---|---|
| 918,319 | 2/1963 | Great Britain. |
| 1,181,437 | 11/1964 | Germany. |

PAUL R. GILLIAM, Primary Examiner

U.S. Cl. X.R.

350—138, 288

UNITED STATES PATENT OFFICE
CERTIFICATE OF CORRECTION

Patent No. 3,489,483
January 13, 1970

Heinz Kraus

It is certified that error appears in the above identified patent and that said Letters Patent are hereby corrected as shown below:

Column 3, line 74, "a" should read -- the --. Column 4, line 10, "30" should read -- 31 --. Column 6, line 10, "optionally" should read -- optically --.

Signed and sealed this 15th day of September 1970.

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,489,483    Dated January 13, 1970

Inventor(s) Heinz Kraus

It is certified that error appears in the above-identified patent and that said Letters Patent are hereby corrected as shown below:

In the heading to the printed specification, after line 7, insert -- Claims priority, application Germany, October 21, 1965, P 14 98 260.6 --.

Signed and sealed this 20th day of April 1971.

(SEAL)
Attest:

EDWARD M. FLETCHER, JR.
Attesting Officer

WILLIAM E. SCHUYLER, JR.
Commissioner of Patents